United States Patent
Chiou

(10) Patent No.: US 6,243,411 B1
(45) Date of Patent: Jun. 5, 2001

(54) INFINITELY EXPANDABLE ETHERNET NETWORK REPEATER UNIT

(75) Inventor: Bin-chi Chiou, Hsinchu (TW)

(73) Assignee: Winbond Electronics Corp. (TW)

( * ) Notice: Subject to any disclaimer, the term of this patent is extended or adjusted under 35 U.S.C. 154(b) by 0 days.

(21) Appl. No.: 08/947,179

(22) Filed: Oct. 8, 1997

(51) Int. Cl.$^7$ ................................................ H04B 3/36
(52) U.S. Cl. ........................................................... 375/211
(58) Field of Search ................................. 375/211, 212, 375/219; 370/445, 401, 246; 455/7

(56) References Cited

U.S. PATENT DOCUMENTS

| | | | |
|---|---|---|---|
| 5,265,123 | 11/1993 | Vijeh et al. | 375/211 |
| 5,430,762 | * 7/1995 | Vijeh et al. | 375/211 |
| 5,517,520 | * 5/1996 | Chi | 375/212 |
| 5,550,803 | * 8/1996 | Crayford et al. | 370/246 |
| 5,566,160 | * 10/1996 | Lo | 370/445 |
| 5,606,664 | * 2/1997 | Brown et al. | 370/407 |
| 5,754,540 | * 5/1998 | Liu et al. | 375/211 |

* cited by examiner

Primary Examiner—Tesfaldet Bocure
(74) Attorney, Agent, or Firm—Proskauer Rose, LLP

(57) ABSTRACT

An expandable repeater includes N repeater units connected to an integrator device and a bus. Each of the N repeater units has an input/output connected to the bus for exchanging clock, data, and to receive network status signals. Each repeater unit also provides status signals to the integrator device. The status signals indicate the data repetition status of that repeater unit to the integrator. The integrator receives N from the reporter unit (where N is the number of repeater units to be combined by the integrator) sets of status signals, supplies network status information to the bus, and exchanges clock information and data from the bus. The integrator selectively executes the data and clock repetition, and provides a global network status signal in response to the status signals received from all of the repeater units connected to the integrator. A number of integrators may be combined in a similar fashion to further expand the repeater. The combinations may be continued, resulting in an hierarchical arrangement of integrators which provides an infinitely expandable repeater.

2 Claims, 12 Drawing Sheets

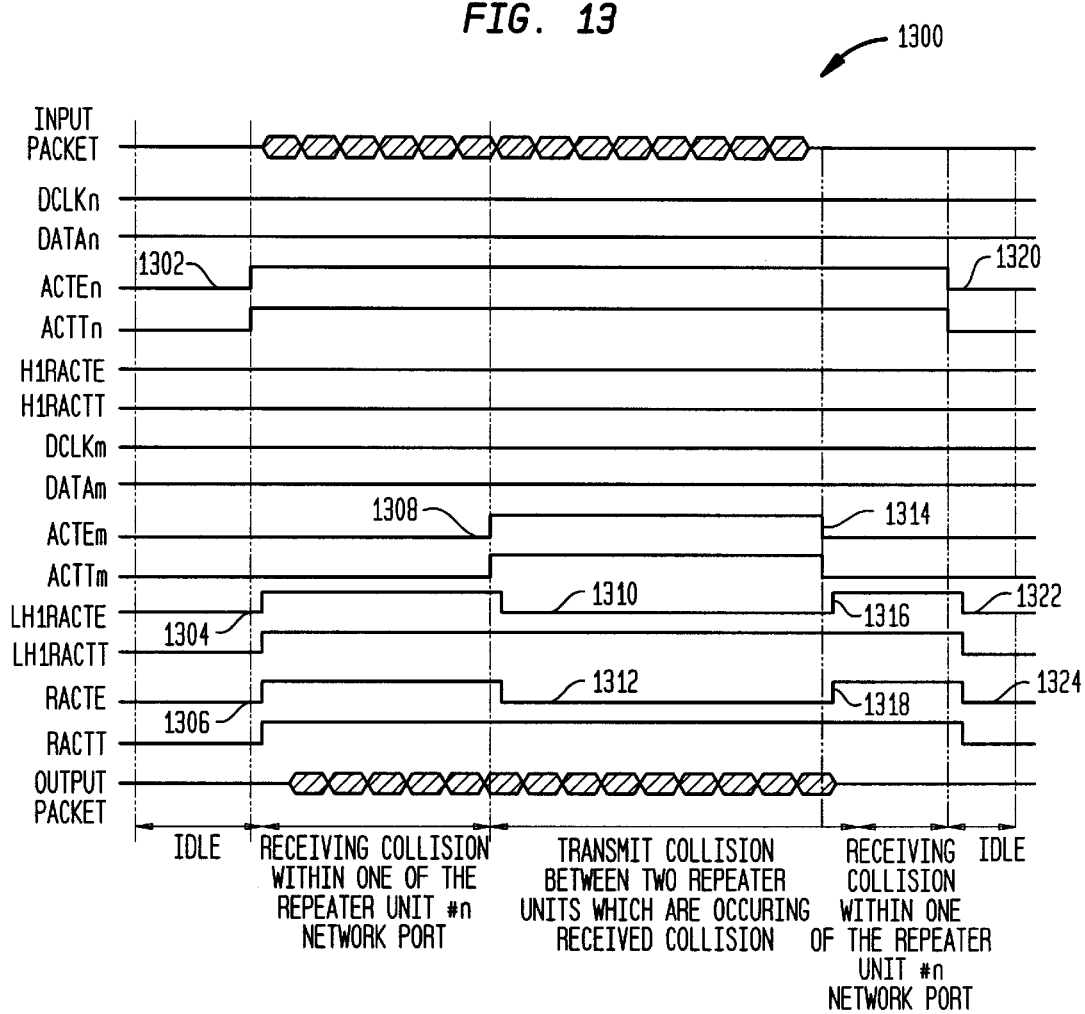

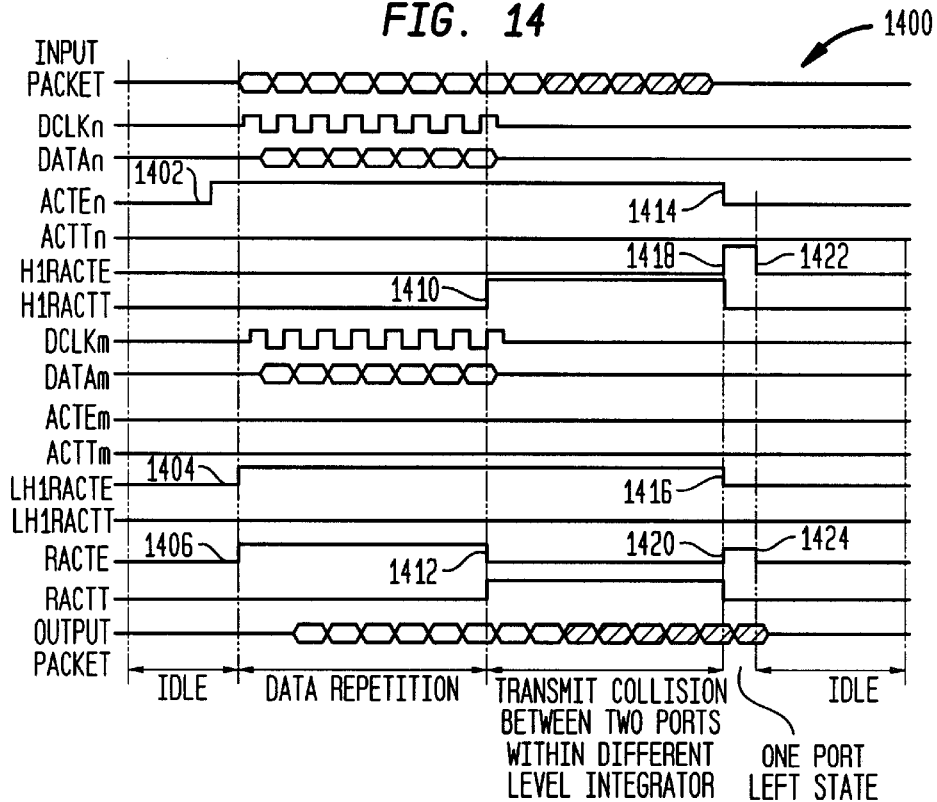
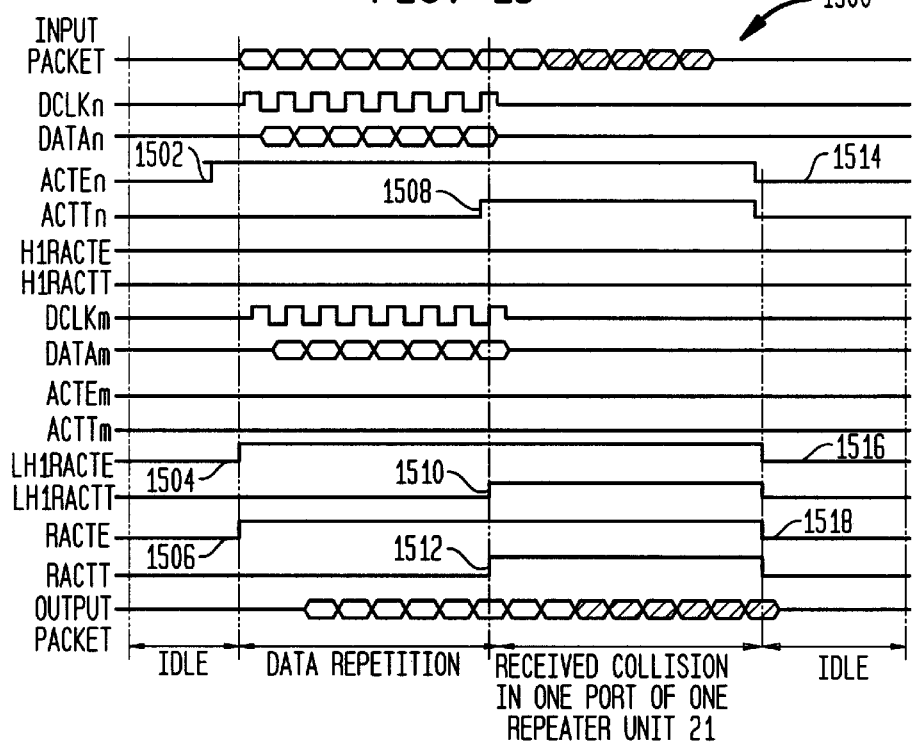

INFINITELY EXPANDABLE ETHERNET NETWORK REPEATER UNIT

RELATED PATENTS AND PATENT APPLICATIONS

The following related patent and patent applications are owned by the assignee of this patent application:

(1) U.S. Pat. No. 5,517,520 entitled "Expandable Repeater" and issued on May 14, 1996 to Chiou;

(2) U.S. patent application Ser. No. 08/919,010, entitled "Expandable Ethernet Network Repeater Unit", filed on Aug. 27, 1997; and (3) U.S. patent application Ser. No. 08/951,874, entitled "Expandable Ethernet Network Repeater", filed on Oct. 17, 1997.

The contents of these patent and patent applications are incorporated herein by reference.

BACKGROUND OF THE INVENTION

1. Field of the Invention

The present invention relates to computer networks and, more particularly, to a repeater unit for use in a Local Area Network operating according to the IEEE 802.3 Standard (an Ethernet network) and which may be expandable to have an unlimited number of ports, yet operates as a single repeater as defined by IEEE 802.3.

2. Discussion of Related Art

Local Area Networks (LAN) are computer networks which allow a number of data terminal equipment (DTE) to share resources and communicate with each other, thus greatly expanding the usefulness of each DTE. Many types of LANs are known. One common LAN type is a Carrier Sense, Multiple Access Collision Detection (CSMA/CD) network, defined by the IEEE 802.3 Standard and commonly referred to as an Ethernet network. (Ethernet is a registered trademark of the XEROX corporation.) The contents of the IEEE 802.3 Standard are incorporated herein by reference.

Briefly, an Ethernet network operates in the following manner. As seen in FIG. 1, an Ethernet network 100 may include a number of DTEs 102 each connected to a port 103 of a central hub or repeater 104. The DTEs and hub are arranged in a star topology. When a DTE 102 wishes to transmit data to other DTEs on the network, the DTE waits for a quiet period on the network, and then sends the intended message to the repeater 104 in bit-serial form. The repeater 104 then repeats the message to all of the DTEs connected to it. If, after initiating a transmission, another DTE also attempts to transmit a message at the same time, a "collision" is detected. If a collision is detected, then both transmitting stations send a few additional bytes to ensure propagation of the collision throughout the network. The transmitted messages are discarded. The DTEs that attempted to transmit remain silent for a random time ("back-off") before attempting to transmit again. Because each DTE 102 selects its back-off time independently of the other DTEs, a second collision may be avoided.

As seen in FIG. 2, a number of repeaters 104 may be connected to create a series 200 of connected hubs or repeaters. To meet IEEE 802.3 timing requirements, the maximum number of repeaters 104 in any series (from any DTE to any other DTE) is four. Moreover, the star topology allows only one DTE to be connected to each port. Limited port availability on repeaters 104 limits the number of DTEs 102 which may connect to a repeater. The limited number of repeaters in any Ethernet series limits the number of DTEs 102 which may be included in a single Ethernet network series (called a collision domain). If each repeater, for example, has eight ports, only 32 DTEs may be connected to a single collision domain. (Note that FIG. 2 shows a collision domain having 26 DTEs.)

A typical repeater comprises a single integrated circuit chip. Because an IC chip has limited drive current, each chip has a limited number of ports. Thus, each repeater is limited to a number of ports, thus limiting the total number of DTEs which may be connected to a single collision domain. Thus, it is desirable to have repeater units which may be expanded to have additional ports.

Expandable repeaters are known. For example, an expandable repeater is described in U.S. Pat. No. 5,265,123 issued on Nov. 23, 1993 to Vijeh, et al. The contents of this document are incorporated herein by reference. Vijeh, et al. disclose an expandable repeater which connects each repeater unit to an expansion bus. For a repeater unit to transmit on the expansion bus, it must seek permission to do so. An arbiter receives request signals from repeat units seeking to transmit onto the bus, determines which repeater unit may control the expansion bus, issues an acknowledgement signal to that repeater unit, and precludes other repeater units from simultaneously controlling the bus.

U.S. Pat. No. 5,517,520, described above, discloses an expandable repeater in which a number of repeater units are connected in a star topology to an integrator unit. Each repeater unit has an input/output for providing clock, data, control, and collision information to the integrator. A repeater unit issues a request-for-access signal when it wants to transmit to the integrator unit.

It is an object of the present invention to provide an expandable repeater which does not use request or acknowledge signals.

SUMMARY OF THE INVENTION

This and other objects of the present invention are provided by a repeater comprising two or more repeater units. The repeater units are connected to an integrator device which coordinates the repeater units to function as a single repeater according to the IEEE 802.3 Standard.

In a preferred embodiment of the present invention, an expandable repeater includes N repeater units connected to an integrator device and a bus. Each of the N repeater units has an input/output connected to the bus for exchanging clock, data, and to receive network status signals. Each repeater unit also provides status signals to the integrator device. The status signals indicate to the integrator whether the repeater unit is transmitting data, ready to receive data, or detecting a collision. The integrator receives N (where N is the number of repeater units to be combined by the integrator) sets of status signals, determines the network status, supplies network status information to the bus, and exchanges clock information and data with the bus. The integrator selectively executes the data and clock repetition, and provides a global network status signal in response to the status signals received from all of the repeater units connected to the integrator. A number of integrators may be combined in a similar fashion to further expand the repeater. The combinations may be continued, resulting in an hierarchical arrangement of integrators which provides an infinitely expandable repeater.

The expandable repeater permits a number of repeater units to be combined to operate as a single repeater, thus increasing the number of DTEs which may be connected to a single Ethernet collision domain. Also, the repeater operates without repeater units requesting access to transmit and does not need to receive an acknowledgment signal before transmitting data to the network.

BRIEF DESCRIPTION OF THE DRAWINGS

The present invention is described with reference to the following figures:

FIGS. 9–15 are timing diagrams illustrating the operation of a preferred embodiment of the present invention.

DETAILED DESCRIPTION OF PREFERRED EMBODIMENTS

The invention is described in the following sections:
I. An overview of the structure and function of a preferred embodiment of an expandable repeater according to the present invention is provided with reference to FIGS. 3–5.
II. Two preferred embodiments of a repeater unit and repeater unit input/output (I/O) are described with references to FIGS. 6A, 6B, 6C, and 6D.
III. First and second level integrators are described with reference to FIGS. 9–11.
IV. Timing diagrams illustrating operation of a preferred embodiment of the present invention are described with reference to FIGS. 12–17.
V. A conclusion is provided.

I. Overview of the Invention

A. Structural Overview

Figure 1:
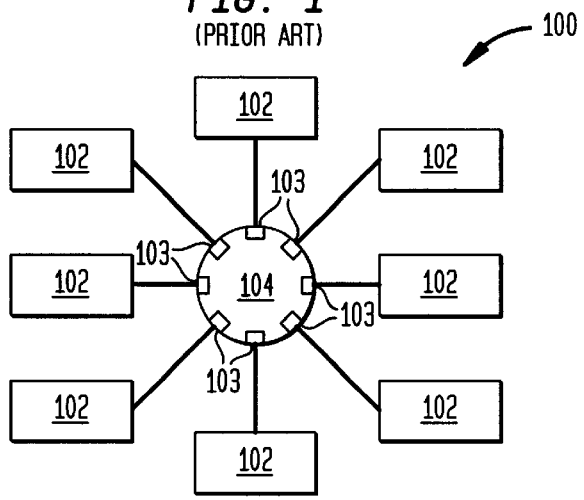
FIG. 1 is a block diagram of a typical Ethernet network having a single repeater.
Figure 2:
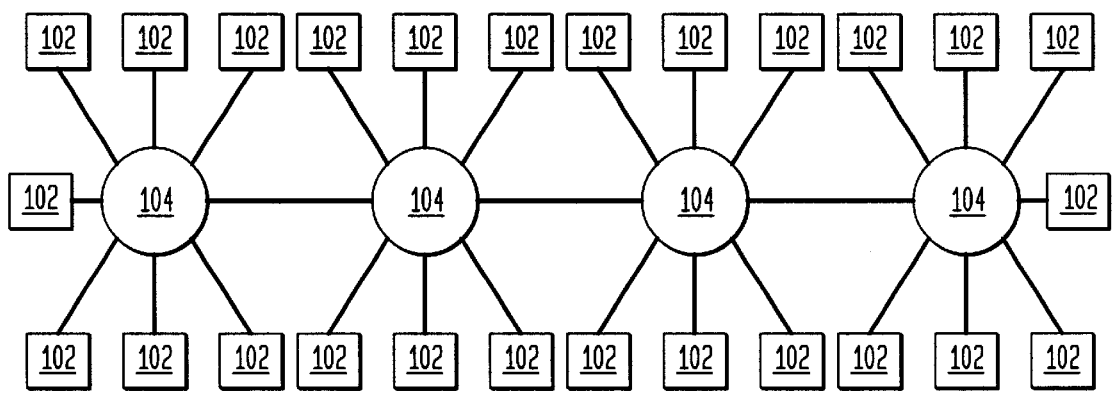
FIG. 2 is a block diagram of an Ethernet network collision domain having a series of four repeaters.
Figure 3:
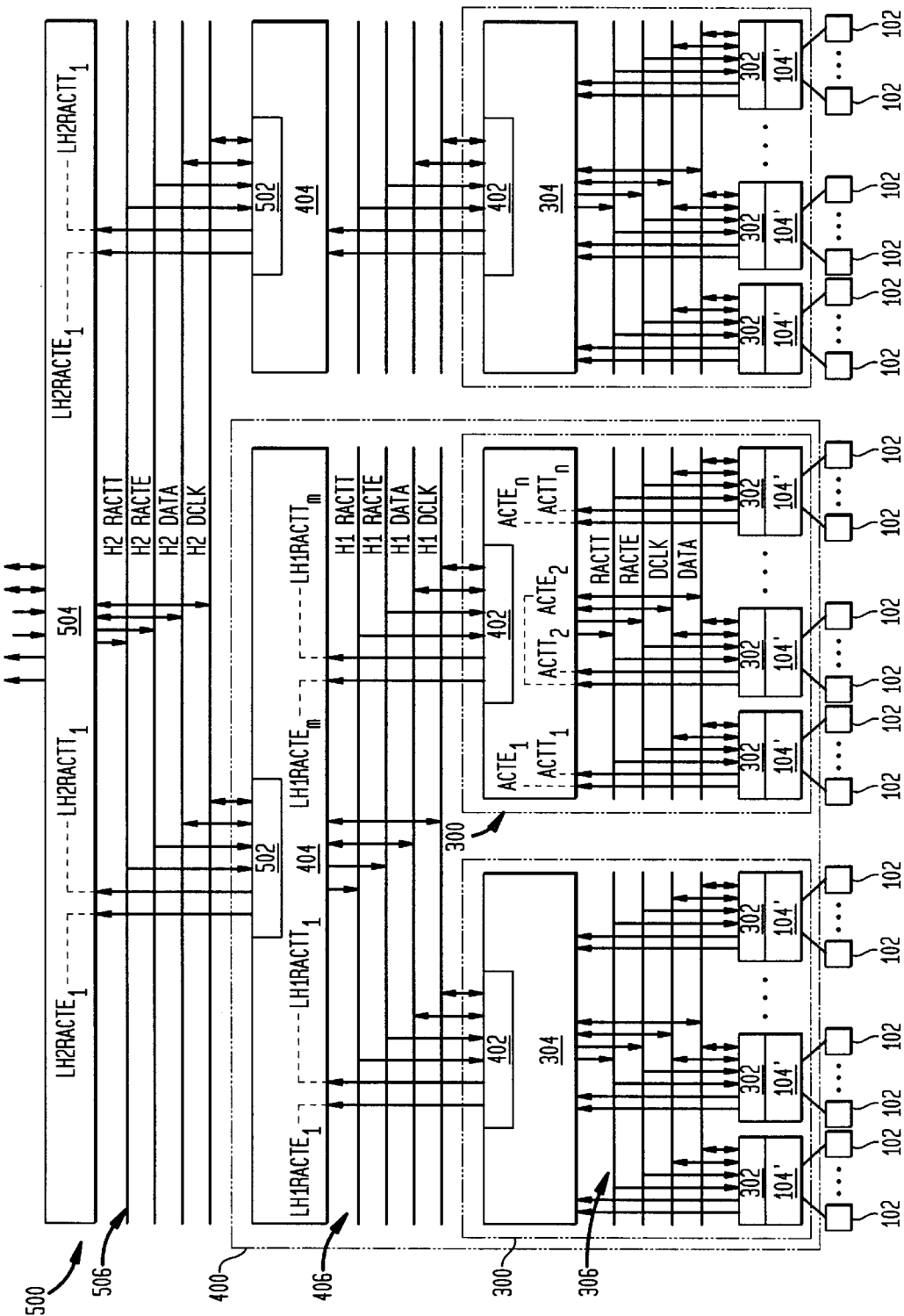
FIG. 3 is a block diagram of a repeater having expandable repeater units according to a preferred embodiment of the present invention.

In accordance with the present invention, FIG. 3 is a block diagram of a preferred embodiment of an expandable repeater including several repeater units 104' combined into a first level repeater set 300. FIG. 3 shows several first level repeater sets 300 combined into a second level repeater set 400 and shows several second level repeater sets 400 combined into a single third level repeater set 500. As described below, the combination of repeater sets operate as a single repeater as defined in the IEEE 802.3 Standard.

Figure 4:
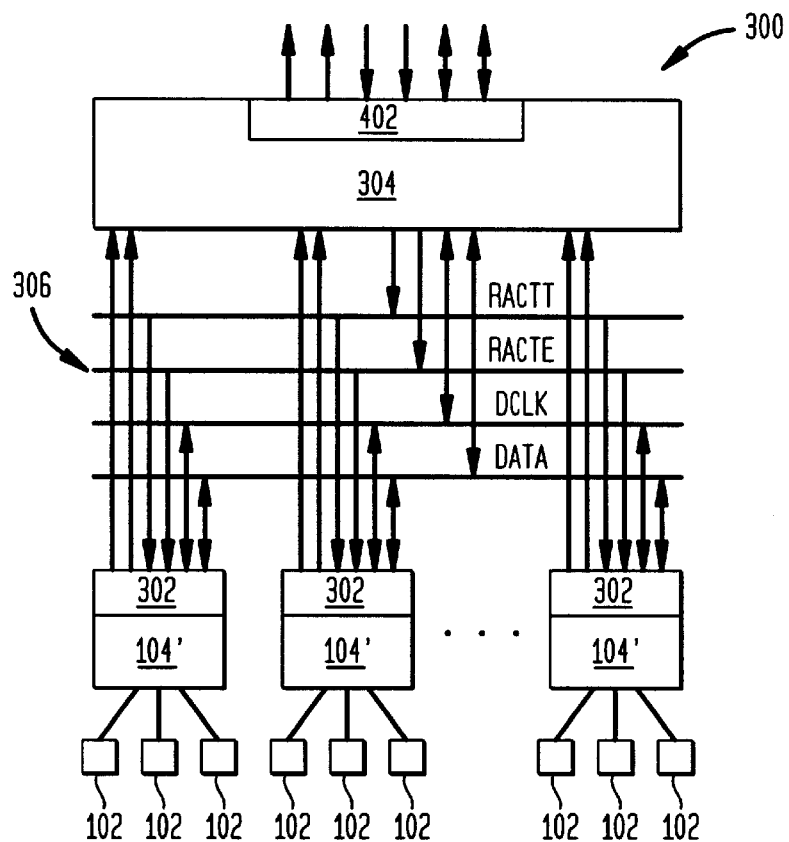
FIG. 4 is a block diagram showing an expandable repeater combining N repeater units according to a preferred embodiment of the present invention.

As seen in FIGS. 3 and 4, the first level repeater set 300 comprises a number of repeater units 104', each repeater unit is connected to a number of DTEs 102. Each repeater unit 104' has an I/O 302 which connects to a first level integrator 304 and a first level bus 306. The I/O 302 transmits a timing clock signal and a data signal to the bus 306, and transmits repeater unit 104' status signals to the first level integrator 304; and receives data, clock, and network status signals from the bus 306. The first level integrator 304 uses the status signals from each repeater unit 104' attached to it (and network status received from higher levels, if any) to generate network status signals sent to the repeater units 104' via the first level bus 306. This exchange of data, clock, and status signals permits a number of repeaters to be connected to the integrator in a manner which permits them to operate as a single repeater.

Figure 5:
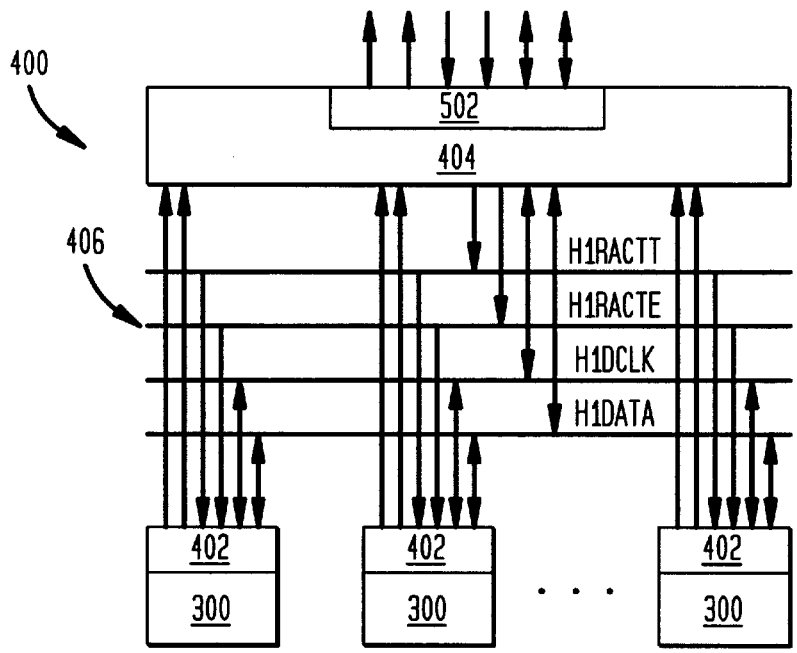
FIG. 5 is a block diagram of a number of expandable repeaters combining N repeaters.

As seen in FIGS. 3 and 5, the second level repeater set 400 comprises a number of first level repeater sets 300. The first level repeater sets 300 each have a first level repeater set I/O 402 which connects to a second level integrator 404 and to a second level bus 406. The first level repeater set I/O 402 transmits a timing clock signal and a data signal for the first level repeater set to the second level bus 406 and transmits first level repeater unit status signals to the second level integrator 404; the I/O 402 receives data, clock, and network status signals from the second level bus 406. The second level integrator 404 uses the status signals from each first level repeater set attached to it (and a network status received from higher level integrators, if any) to generate network status signals sent to the first level integrators via the second level bus 406. This exchange of data, clock, and status signals permit a number of first level repeater sets 300 to be connected to the second level integrator 404 in a manner which permits them to operate as a single repeater.

As seen in FIG. 3, a third level repeater set 500 comprises a number of second level repeater sets 400, each second level repeater set 400 connected to a number of first level repeater sets 300. The second level repeater sets 400 each have a second level repeater set I/O 502 which connects to a third level integrator 504 and a third level bus 506. Timing, data, and network status signals are exchanged in a manner similar to those described above. This exchange of data, clock, and status signals permit a number of second level repeater sets 400 to be connected to the third level integrator in a manner which permits them to operate as a single repeater.

B. Functional Overview

To understand the function of the expandable repeater according to the present invention, the operation of a first level repeater set 300 is described.

A first level integrator 304 receives status signals (ACTEn, ACTTn) (wherein n indicates that the signal represents a particular repeater unit 104'; n=1, 2, . . . N) from each repeater unit 104' connected to it. The first level integrator 304 may also receive a network status signal from a second level (H1RACTE, H1RACTT). These status signals are used to generate network status signals (RACTT, RACTE) which are transmitted to the first level bus 306, where they are accessed by each repeater unit 104' connected to the bus 306. (The first level integrator 306 may provide status signals LH1RACTTm and LH1RACTEm to a second level integrator 404).

If the network status signals indicate that the network is in the ready state, a DTE 102 may transmit information to the repeater unit 104' to which it is connected (for example, repeater unit 1). This transmission places repeater unit 1 in the receive state. This status change is detected by the integrator 304, which changes the network status signals. This alerts all repeater units 104' (and higher level integrators) that a transmission is coming. The data and clock information is placed on the first level bus 306 and, if there are higher level integrators, accessed by the first level integrator 304 and placed on the second level bus 406.

If during the transmission from repeater unit 1, another DTE 102 attempts to send a transmission, a collision is detected and the network status signals are changed accordingly. This alerts all of the repeater units to discard the received data and the collision is handled in a conventional manner pursuant to the IEEE 802.3 Standard.

II. The Repeater Units & Repeater Units I/O

Each of the N repeater units 104' is preferably a monolithic integrated circuit which primarily performs state machine functions required by the IEEE 802.3 Standard. These functions are well known and are not further described.

The repeater unit I/O 302 connects a repeater unit 104' to the first level integrator 304 and first level bus 306. Thus, the I/O 304 exchanges information between the repeater unit 104' and the integrator 304.

Figure 6A:
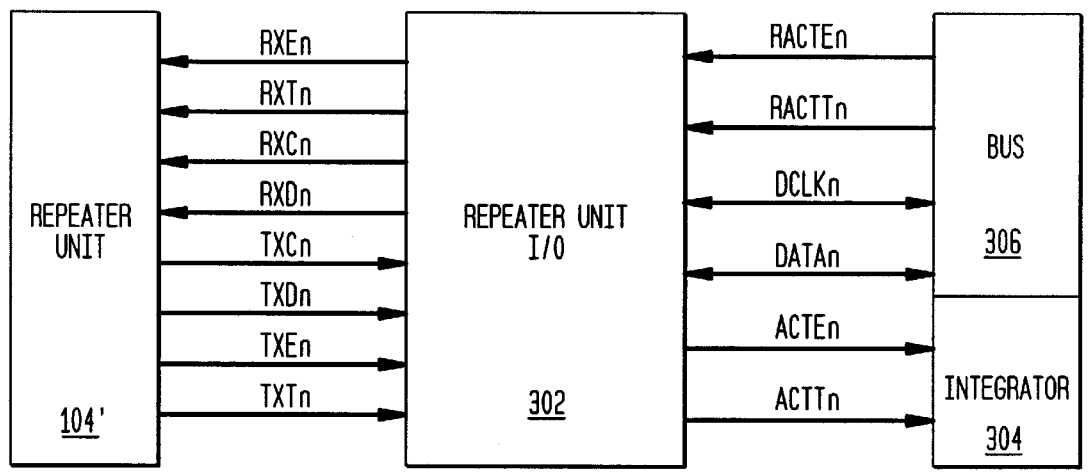
FIG. 6A is a block diagram of a first preferred embodiment of a repeater I/O.

FIG. 6A is a block diagram of a first preferred embodiment of repeater unit I/O 302 and shows the signals exchanged between the I/O 302 and the repeater unit 104', and between the I/O and the first level integrator 304 and the first level bus 306.

The I/O 302 receives the following signals from the repeater unit 104':

TXCn: transmit data clock of repeater unit n
TXDn: transmit data of repeater unit n
TXEn: transmit enable of repeater unit n
TXTn: transmit type of repeater unit n These signals are data (TXD) and timing information (TXC) received from a DTE 102 connected to the repeater unit to be repeated to other repeater units; and repeater unit status information (TXE, TXT).

The repeater unit I/O 302 sends to the repeater unit 104' the following signals:

RXCn: receive data clock from the integrator 304
RXDn: receive data from the integrator 304
RXEn: received enable status
RXTn: received type status These are data (RXD) and timing information (RXC) received from the first level integrator to be repeated to the DTEs 102 connected to the repeater unit, and the network status signals (RXEn, RXTn).

The repeater unit I/O 302 receives the following signals from the first level bus 306, 402:

RACTEn: received active enable status received from the first level integrator;
RACTTn: received active type status received from the first level integrator.

RACTEn and RACTTn are repeater activity status indication signals received from the first level integrator 402.

Bidirectional lines which are selectively input or output (as discussed in detail below) between the I/O 302 and the bus 306 are:

DCLKn: data clock
DATAn: data

The DCLKn and DATAn lines are bidirectional. When the Nth repeater unit is in the READY state (described below), it may receive data and clock information on the DATAn and DCLKn bus lines from the first level integrator 304 to repeat to the DTEs 102 connected to it. When the Nth repeater unit 104' is transmitting data received from a DTE 102 connected to it, the repeater unit 104' outputs data and clock information on the DCLKn and DATAn bus lines.

DATAn is a data signal synchronized with DCLKn. The clock on DCLKn is used to latch the data on DATAn when the Nth data repeater unit 104' is repeating data received from the integrator 304 connected to it and is used to repeat the DATAn sent from the first level integrator 304. The latched data may be buffered into an internal FIFO memory of the Nth data repeater unit 104' for transmitting to the DTEs 102 connected to it. The DCLKn received by a repeater unit 104' need not be synchronized with the repeater unit receiving the data, but should be synchronized with the operation clock of the repeater unit 104' which is transmitting the data to the first level integrator 304. Thus, DATAn may be transmitted asynchronously to the repeater unit 104'. Note that the frequency of the clock DCLKn is the data rate of the data on DATAn.

The repeater unit I/O 302 sends the following signals to the first level integrator 304:

ACTEn: activity enable for repeater unit n
ACTTn: activity type for repeater unit n These are activity status indication signals for the Nth data repeater unit 104'. ACTEn is a repeater "activity enable" signal and ACTTn is a repeater "activity type" signal. These two signals provide four types of activity status of the Nth data repeater unit. The four types of status activity are: (1) ready to receive data (READY), (2) receiving data (RXING), (3) detecting a receive collision (RXCOL), and (4) detecting a transmit collision (TXCOL). When the Nth data repeater unit is in the READY state, the repeater unit 104' is ready to receive and repeat data from its I/O 302, and no collision has occurred. When the Nth data repeater unit 104' is in the RXING state, the repeater unit 104' is ready to receive and repeat data from one of its DTE ports 103 and will transmit the received data to the other DTEs connected to the repeater unit 104'. The received data will also be transmitted on the I/O 302, where it will be received by the first level integrator 304 and ultimately transmitted to the other repeater units 104' connected to the first level integrator 304 (and to higher level integrators, if any). The Nth data repeater unit 104' is in the RXCOL state if it receives data which has already collided. The data received on the I/O 302 during a received collision is discarded.

The Nth data repeater unit will be in the TXCOL state when the repeater unit 104' receives a packet from one of the DTEs 102 connected to it or from I/O 302, and while transmitting the received data to other DTEs, detects data coming from one or more other network ports 103 other than the port on which it is already receiving data.

The table below shows the relationship between ACTEn and ACTTn and the four states.

|  | READYn | RXINGn | TXCOLn | RXCOLn |
| --- | --- | --- | --- | --- |
| ACTTn | 0 | 0 | 1 | 1 |
| ACTEn | 0 | 1 | 0 | 1 |

Note: 0 indicates that the signal is deasserted.
1 indicates that the signal is asserted.

If the repeater device is an active low device, a low voltage is an assertion of the signal and a high voltage is a deassertion of the signal.

Figure 6B:
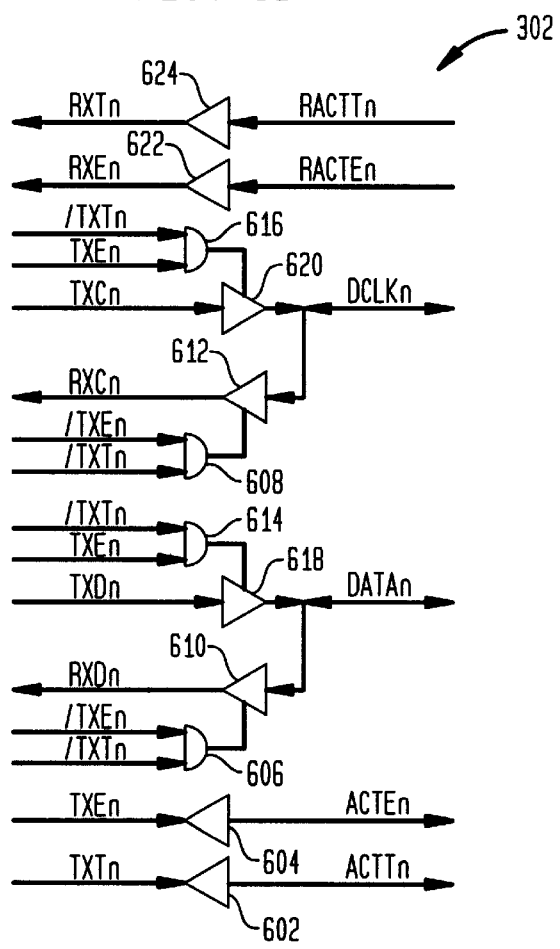
FIG. 6B is a block diagram of the repeater unit I/O of FIG. 6A.

FIG. 6B is a schematic diagram illustrating operation of the repeater unit I/O 302 illustrated in FIG. 6A. The transmit type (TXTn) signal is passed by a driver 602 to become the ACTTn signal. The transmit enable (TXEn) signal is passed by a driver 604 to become the ACTEn signal. When the TXEn and TXTn signals are deasserted, the repeater unit 104' is in the READY state (e.g., is ready to receive a transmission) and the output of AND gates 606, 608 turn on drivers 610, 612. This permits the DATAn and DCLKn signals to be input to the repeater unit as the RXDn and RXCn signals.

When the TXEn signal is asserted and the TXTn signal is not asserted, the repeater unit is in the RXING state (e.g., it is receiving a transmission from a DTE) and the output of AND gates 614, 616 turn on drivers 618, 620. This allows the TXDn and TXCn signals to be output to the first level bus 306 as the DATAn and DCLKn signals, respectively. The RACTEn and RACTTn signals are sent to drivers 622, 624 and sent to the repeater unit 104' as the RXEn and RXTn signals, respectively.

Figure 6C:
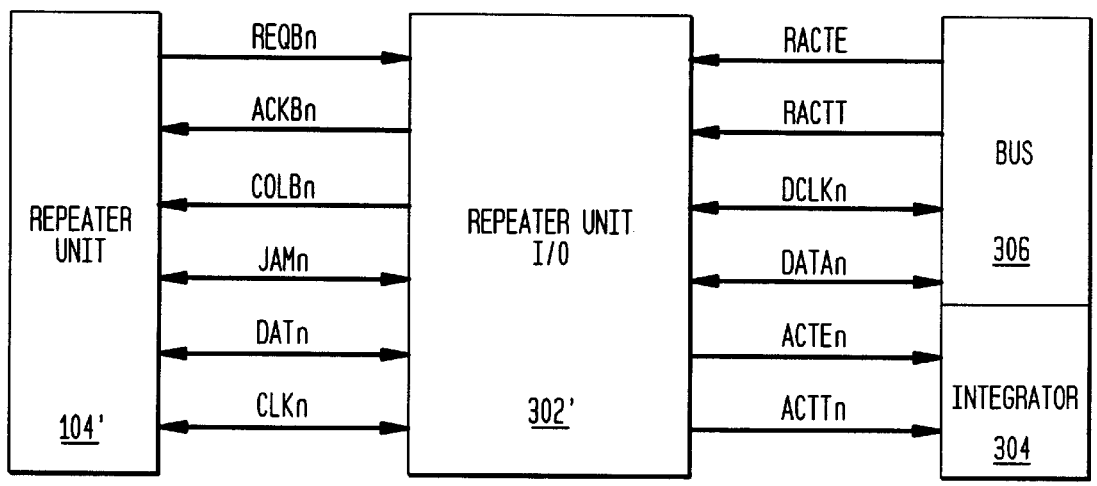
FIG. 6C is a block diagram of a second preferred embodiment of a repeater I/O.

FIG. 6C is a block diagram of a second preferred embodiment of a repeater unit I/O 302' and shows the signals exchanged between the I/O 302' and the repeater unit 104', and between the I/O and the first level integrator 304 and the first level bus 306.

The I/O 302' receives the following signals from the repeater unit 104':

REQBn: repeater unit 104 request to transmit data and clock information

The repeater unit I/O 302' sends to the repeater unit 104' the following signals:

ACKBn: integrator signal responding to a REQBn signal indicating that the request to transmit is granted.

COLBn: the repeater unit I/O 302 indicating the presence of a collision between different repeater units 104.

Bidirectional lines which are selectively input or output (as discussed in detail below) between the I/O 302' and the repeater unit 104' are:

JAMn: a JAM pattern indicating a collision;

DATn: packet data or collision type information; and

CLKn: packet data clock information.

The repeater unit I/O 302' receives the following signals from the first level bus 306, 402:

RACTE: received active enable status received from the first level integrator;

RACTT: received active type status received from the first level integrator.

RACTE and RACTT are repeater activity status indication signals received from the first level integrator 402.

Bidirectional lines which are selectively input or output (as discussed in detail below) between the I/O 302' and the bus 306 are:

DCLK: data clock

DATAn: data

The DCLKn and DATAn lines are bidirectional, as described above with reference to FIG. 6A. DATAn is a data signal synchronized with DCLK, as described above with reference to FIG. 6A.

The repeater unit I/O 302' sends the following signals to the first level integrator 304:

ACTEn: activity enable for repeater unit n

ACTTn: activity type for repeater unit n

These are activity status indication signals for the Nth data repeater unit 104', as described above.

Figure 6D:
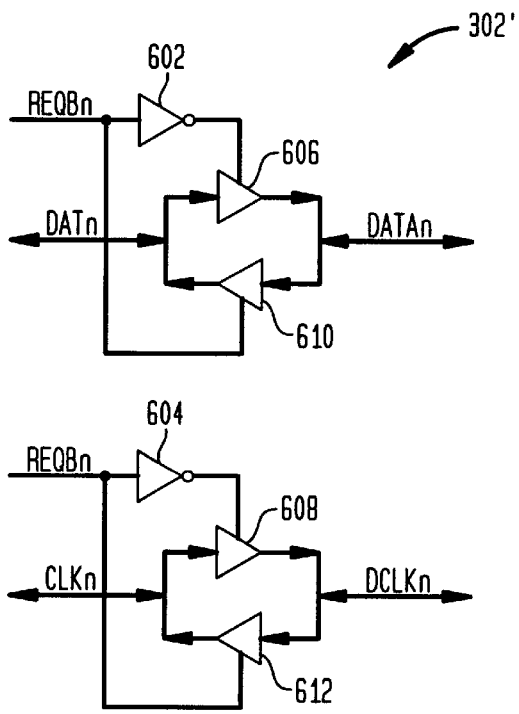
FIG. 6D is a block diagram of the repeater unit I/O of FIG. 6C.

FIG. 6D is a schematic diagram illustrating operation of the repeater unit I/O 302' illustrated in FIG. 6C. When the repeater unit 104' asserts a REQBn signal from the repeater unit 104', the signal is received by an inverters 602, 604 (in this embodiment, assume that the repeater unit 104' is an active low device). The outputs of the inverters activate drivers 606, 608. The activated drivers permit the DATn and CLKn signals to be transmitted from the repeater unit 104' to the repeater unit I/O 302' and the DATAn and DCLKn signals to be transmitted from the repeater unit I/O 302' to the integrator 304.

When the REQBn signal is not asserted by the repeater unit 104', drivers 610, 612 are activated. The activated drivers permit the DATAn and DCLKn signals to be received from the integrator 304 and the DATn and CLKn signals to be received from the repeater unit I/O 302.

The relationship between inputs REQBn, JAMn, and DATn and outputs ACTTn and ACTEn are set out in the following table:

| INPUTS | | | OUT PUTS | |
| --- | --- | --- | --- | --- |
| REQBn | JAMn | DATn | ACTTn | ACTEn |
| 1 | X | X | 0 | 0 |
| 0 | 0 | X | 0 | 1 |
| 0 | 1 | 0 | 1 | 0 |
| 0 | 1 | 1 | 1 | 1 |

The relationship between inputs RACTT, RACTE, REQBn, and outputs ACKBn, COLBn, and JAM are set out in the following table:

| INPUT | | | OUTPUT | | |
| --- | --- | --- | --- | --- | --- |
| RACTT | RACTE | REQBn | ACKBn | COLBn | JAMn |
| 0 | 0 | 0 | 0 | 1 | Z |
| 0 | 0 | 1 | 1 | 1 | Z |
| 0 | 1 | 0 | 0 | 1 | Z |
| 0 | 1 | 1 | 0 | 1 | Z |
| 1 | 0 | 0 | 1 | 0 | Z |
| 1 | 0 | 1 | 1 | 0 | Z |
| 1 | 1 | 0 | 0 | 1 | Z |
| 1 | 1 | 1 | 0 | 1 | 1 |

III. The Integrator

Figure 7A:
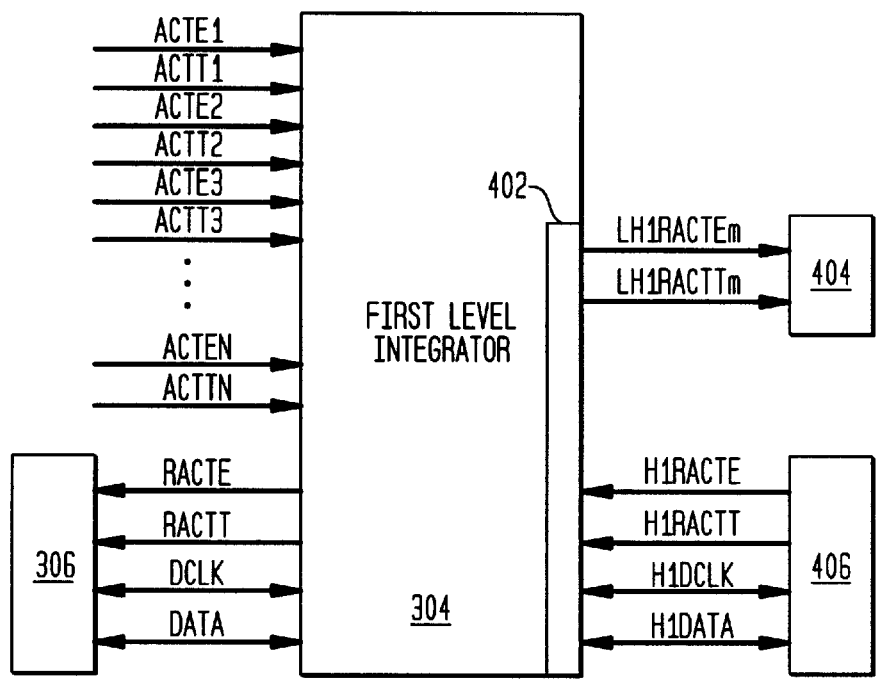
FIG. 7A is a block diagram of a preferred embodiment of a first level integrator.

FIG. 7A is a block diagram of the first level integrator 304 and shows the signals sent and received by the first level integrator 304. The first level integrator 304 exchanges signals between the N repeater unit I/O's 302 connected to it, and the first level bus 306, and, via first level repeater set I/O 402, with the second level integrator 404 (if any) and the second level bus 406 (if any).

The signals that the first level integrator 304 receives from each repeater unit I/O 302 are:

ACTEn: carrier sense enable for repeater unit n

ACCTn: carrier sense type for repeater unit n

The first level integrator 304 sends the RACTE and RACTT signals to the first level bus 306 to be accessed by the repeater units 104' connected to the first level bus 306. As described above, the DCLKn and DATAn lines are bidirectional, depending on whether data is being transmitted from the repeater unit 104' to the integrator 304 or vice versa. Thus, if the first level integrator 304 receives data and clock information from a higher level integrator (e.g., H1DATA and H1DCLK discussed below), this information is transmitted to each repeater unit (1, 2 . . . N) connected to the integrator 304. If the first level integrator 304 receives data and clock information from the first level bus 306, it may transmit this information to a higher level integrator. Note that if a repeater unit 104' transmits data and clock information to the first level bus 306, the other repeater units connected to the bus access the information from the bus.

FIG. 7A also shows that the first level integrator 304 sends the following signals to a second level integrator 404 via first level repeater set I/O 402:

LH1RACTEm: carrier sense enable for first level integrator m

LH1RACTTm: carrier sense type for first level repeater m (M is the number of first level repeater sets connected to the second level integrator and m=1, 2 . . . M.) These signals indicate the activity status of the expandable repeater 300 coordinated by the first level integrator 304. The activity types are the same as those described with reference to ACTE and ACTT in the table set out above.

The first level integrator I/O 402 receives the following signals from the second level bus 406:

H1RACTE: carrier sense enable of second level repeater set coordinated by second level integrator H1RACTT: carrier sense type of second level repeater set coordinated by second level integrator These signals represent the activity status of a second level repeater comprising a number of first level integrators 304 coordinated by a second level integrator 404. The first level integrator 304 may also transmit or receive clock information and data from the second level bus 406 via its I/O 402. This second level clock information and data are designated H1DCLK and H1DATA.

Figure 7B:
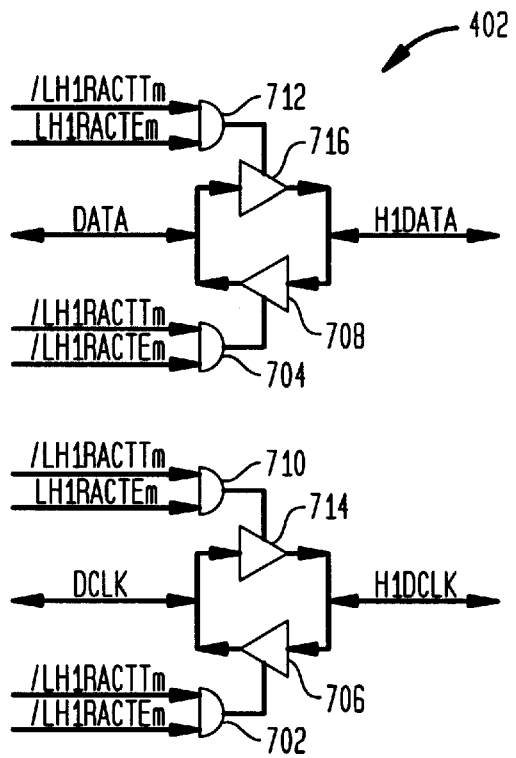
FIG. 7B is a block diagram of the repeater unit integrator of FIG. 7A.

FIG. 7B is a block diagram illustrating the operation of a preferred embodiment of first level repeater set I/O 402. When LH1RACTTm and LH1RACTEm signals are deasserted, the first level integrator 304 is in the READY state and the output of AND gates 702, 704 turn on drivers 706, 708. This allows H1DCLK and H1DATA to be input to the first level integrator 304 for input onto the first level bus 306. When the LH1RACTEm signal is asserted and LH1RACTTm signal is deasserted, the outputs of AND gates 710, 712 turn on drivers 714, 716. This allows DATA and DCLK signals to be output from the first level integrator 304 to the second level bus 406. Any other combination of LH1RACTEm and LH1RACTTm (e.g., when a collision is detected) will not turn on the drivers and data and timing signals will not flow on the DATAn (H1DATA) and DCLKn (H1DCLK) bus lines.

Figure 8:
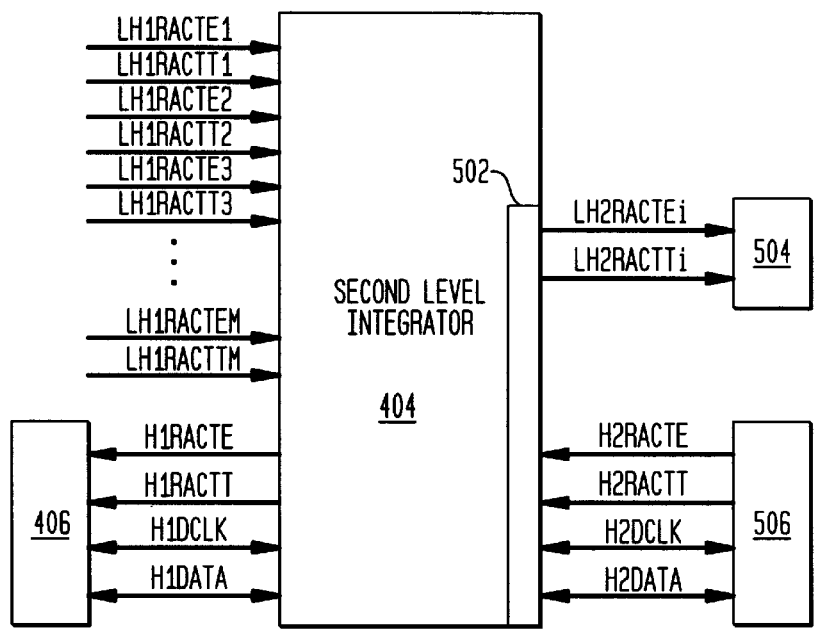
FIG. 8 is a block diagram of a preferred embodiment of a second level integrator.

FIG. 8 is a block diagram of a second level integrator 404. The second level integrator operates in the same manner as the first level integrator. Second level integrator receives status signals (LH1RACTEm, LH1RACTTm) from each of the first level integrators 304 attached to it, provides second level status signals (H1RACTE, H1RACTT) to the second level bus 406, and transmits or receives clock information (H1DCLK) and data (H1DATA) from the second level bus.

The second level integrator also has a second level repeater set I/O 502 which may be connected to a third level integrator 504 and third level bus 506. The reader readily recognizes that the number of integrator levels increases the number of DTEs 102 connected to a single repeater. Thus, an hierarchical arrangement providing an infinitely expandable repeater is described.

IV. Timing Diagrams

The operation of a two level repeater set 400 according to a preferred embodiment of the present invention is described with reference to a number of timing diagrams.

Figure 9:
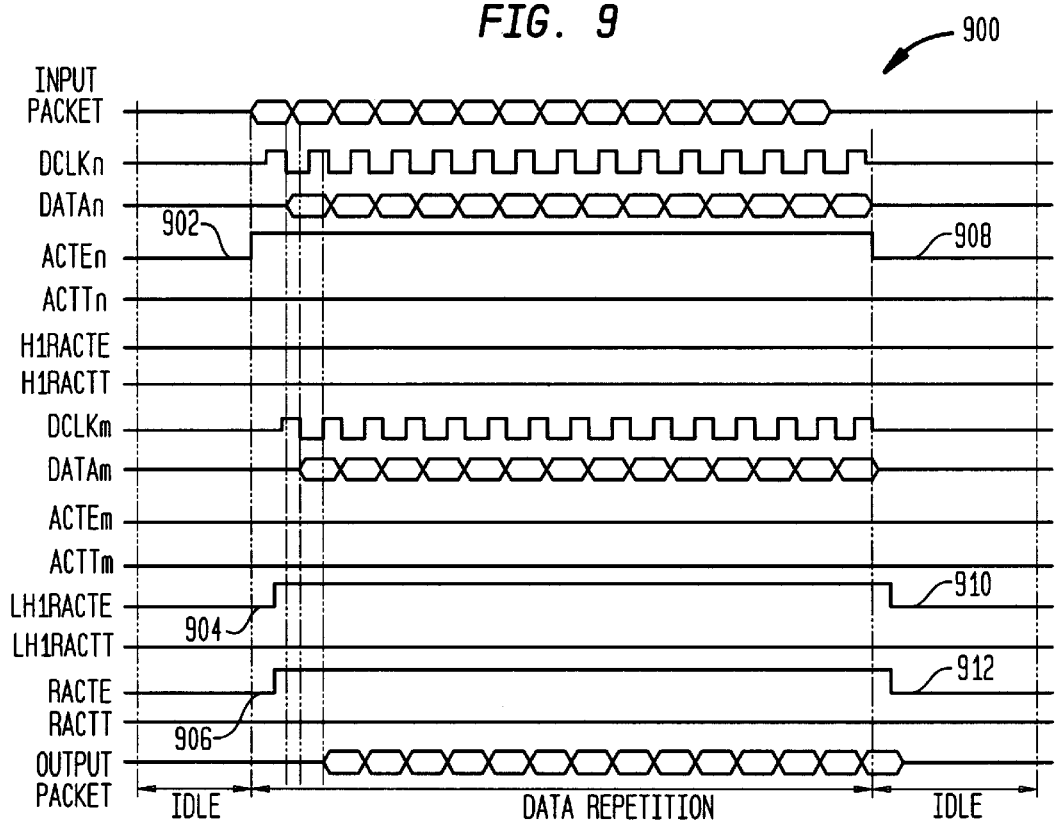

FIG. 9 is a timing diagram 900 illustrating the operation of the present invention when a repeater unit N receives data and clock information from a DTE 102 connected to it and transmits the data to the first level bus 306, and the data and clock information are accessed by the first level integrator 304 for transmission to the second level integrator. In FIG. 9, repeater N begins in the READY state. (Note that ACTEn and ACTTn are deasserted.) A DTE 102 connected to repeater unit N transmits information to the repeater unit 104' and repeater unit N enters the RXING state 902. (Note that ACTEn is asserted.) After a brief propagation delay, the status for the first level integrator transitions from READY to RXING (LH1RACTE and RACTE are asserted) 904, 906. Repeater N transmits a clock and data signal from the DTE 102 to the first level bus 306. The integrator 304 accesses the data and clock signals from the bus 306 and transmits this data and clock to each bus to which it is connected (both first and second level busses). The data and clock signals are accessed by a repeater unit M, which, after a brief propagation delay, appears as DCLKm and DATAm signals. After the data has been repeated, repeater N returns to the READY state 908. After a brief propagation delay, the network status signals transition from the RXING state to the READY state 910, 912. Note that second level integrator 404 is not transmitting information to the first level integrator 102 and thus remains in the READY state (i.e., H1RACTE and H1RACTT are deasserted) throughout the data repetition process.

Figure 10:
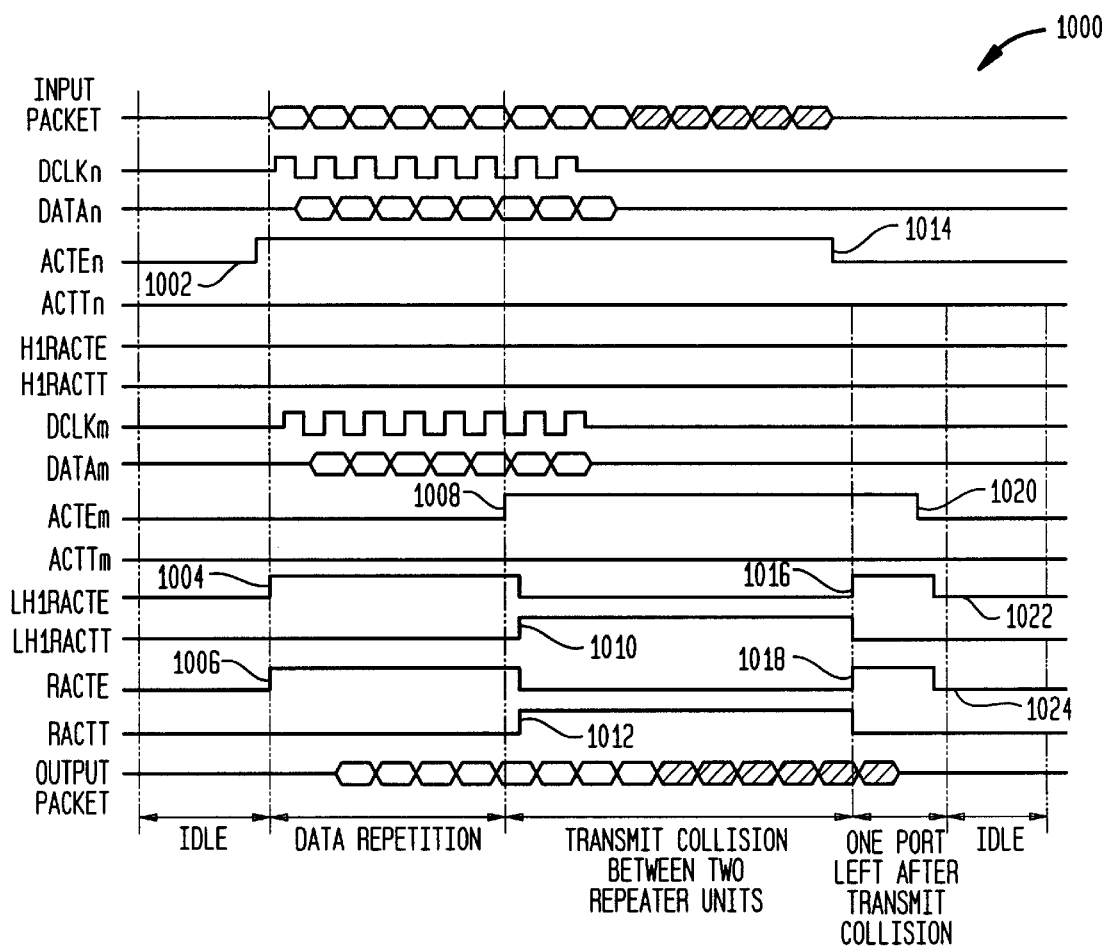

FIG. 10 is a timing diagram 1000 illustrating the operation of the present invention during a first type of transmit collision in which two repeater units N and M (connected to the same first level bus 306 and integrator 304) both attempt to transmit data to the integrator 304 at the same time. Repeater units N and M begin in the READY state. Note that ACTEn, ACTTn, ACTEm, and ACTTm are all deasserted. When repeater N receives data from a DTE 102 connected to it, it enters the RXING state 1002. (Note that ACTEn is asserted.) After a brief propagation delay, the status for first the level integrator transitions from READY to RXING (i.e., LH1RACTE and RACTE are asserted) 1004, 1006. Repeater N receives clock and data signals from a DTE connected to it. After a brief propagation delay, repeater M receives the clock and data transmitted by repeater unit N via a first level bus 306.

During the data repetition of the data received from repeater unit N, repeater unit M receives data from a DTE 102 connected to it 1008. (Note ACTEm is asserted 1008, placing the repeater unit M into the RXING state.) Because two different repeater units are receiving data at the same time, a transmit collision occurs in the first level integrator 304. Thus, after a brief propagation delay after ACTEm is asserted, LH1RACTE is deasserted, LH1RACTT is asserted 1010, RACTE is deasserted, and RACTT is asserted 1012, indicating a transmit collision between two repeater units 1010, 1012. The integrator 304 will not repeat the data and clock on DATAn and DCLKn and never activates the drivers for DATAm and DCLKm. Note that the collision does not occur in the repeater units N or M, but rather in the integrator 304. Thus, neither repeater unit detects the collision, and the ACTEn, ACTTn, ACTEm, and ACTTm signals do not indicate a transmit collision. When repeater unit N's incoming data ends, it leaves the RXING state 1014. After a brief propagation delay, the transmit collision state ends and the first level integrator returns to the RXING state (i.e., H1RACTE is asserted, LH1RATT is deasserted, RACTE is asserted, and RACTT is deasserted) 1016, 1018, because repeater unit M remains in the RXING state. When repeater unit M transitions from the RXING state to the READY state 1020, the first level integrator 304 returns to the READY state as well 1022, 1024.

Figure 11:
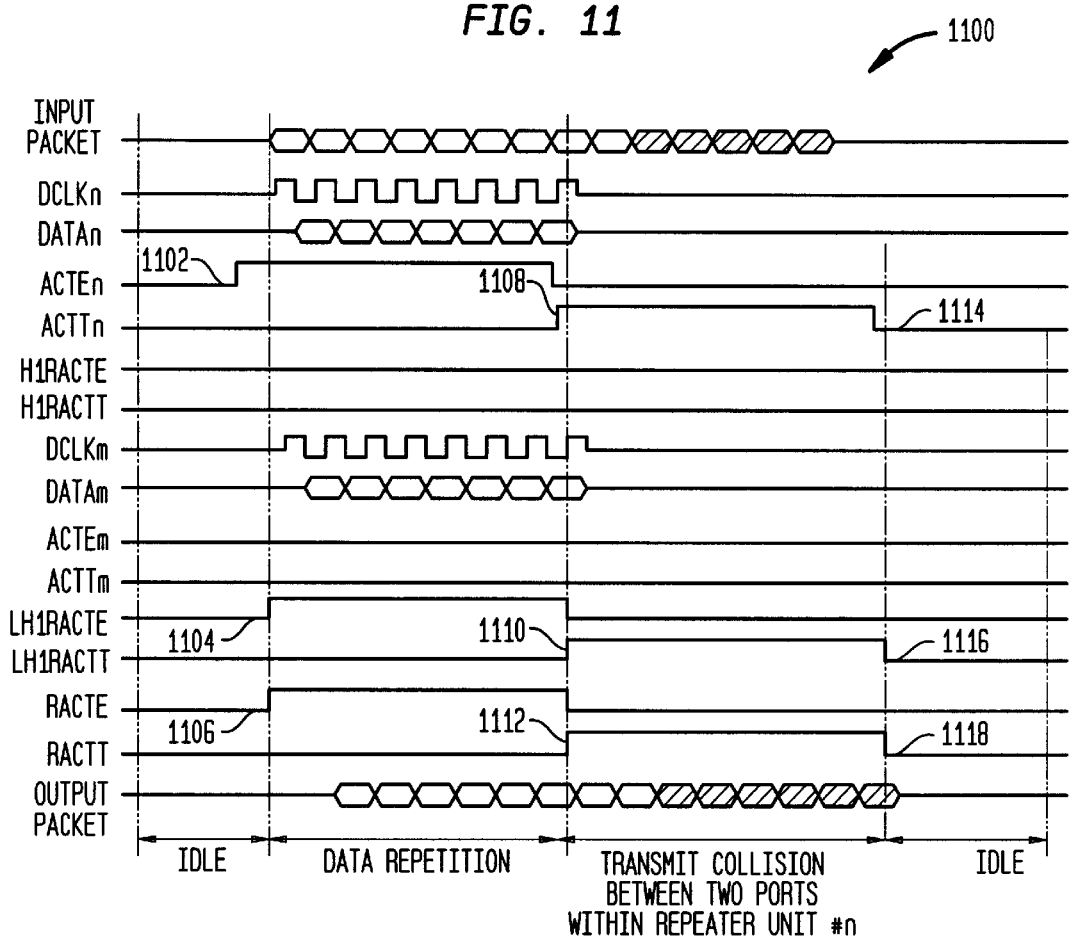

FIG. 11 is a timing diagram 1100 illustrating the operation of the present invention when a transmit collision occurs within the same repeater unit N. Repeater units N and M are in the READY state. Repeater unit N receives a transmission for a DTE 102 connected to it and enters the RXING state 1102. (Note that ACTEn is asserted.) After a brief propagation delay, the first level integrator transitions from the READY state to the RXING state 1104, 1106. A DTE connected to repeater unit N transmits clock and data to repeater unit N. During this transmission, another DTE 102 connected to repeater unit N also attempts to transmit to the repeater unit. At this time, ACTEn is deasserted and ACTTn is asserted 1108, indicating a transmit collision (TXCOL). After a brief propagation delay, the first level integrator 304 indicates a transmit collision 1110, 1112 (e.g., LH1RACTE is deasserted, LH1RACTT is asserted, RACTE is deasserted, and RACTT is asserted). The received DATAn and DCLKn are not repeated while the transmission collision is detected. After the transmit collision ceases, repeater unit N returns to the READY state 1114. After a brief propagation delay, the first level repeater also returns to the READY state 1116, 1118.

Figure 12:
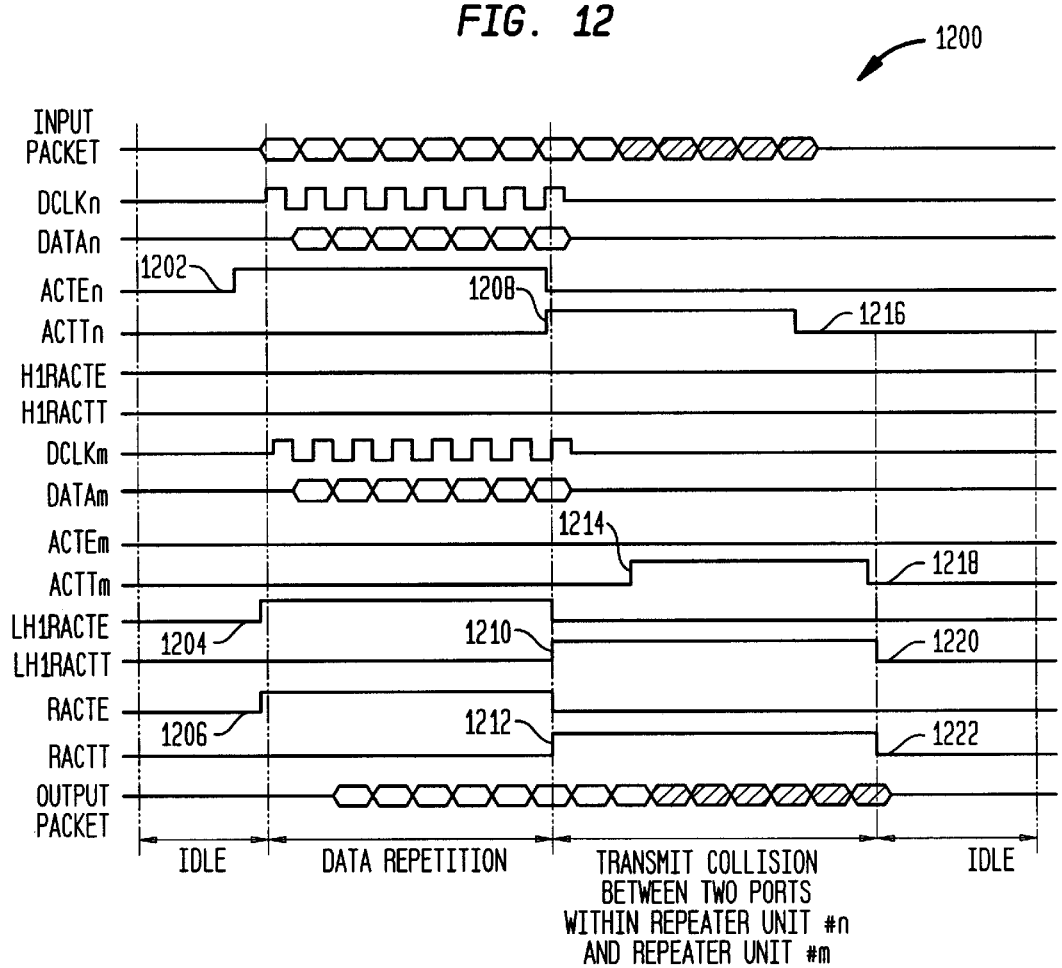

FIG. 12 is a timing diagram 1200 illustrating the operation of the present invention when a transmit collision occurs wherein two ports on repeater unit N and two ports on repeater unit M attempt to transmit at the same time. Repeater units N and M begin in the READY state. A DTE 102 connected to repeater unit N transmits data to repeater unit N. Repeater unit N enters the RXING state 1202. (ACTEn is asserted.) The first level integrator 304 transitions from the READY state to the RXING state 1204, 1206. Repeater unit N receives clock and data from a DTE 102 connected to it. During reception of this data and clock, another DTE connected to repeater unit N attempts to transmit. At this time, ACTEn is deasserted and ACTTn is asserted 1208, indicating a transmit collision (TXCOL). The first level integrator 304 indicates a transmit collision 1210, 1212 (e.g., LH1RACTE is deasserted, LH1RATT is asserted, RACTE is deasserted, and RACTT is asserted). During the transmit collision signal, a DTE 102 connected to repeater unit M attempts to transmit to repeater unit M. ACTTm is asserted 1214, indicating the repeater unit M is in the TXCOL state. Because the first level integrator already indicates a transmit collision, its status signals do not change. When the repeater unit N returns to the READY state 1216, repeater unit M is still in the TXCOL state and therefore the first level integrator status signals remain in the transmit collision state. When repeater unit M returns to the READY state 1218, after a brief propagation delay, the first level integrator status signals return to the READY state 1220, 1222. Typically, ACTEm and ACTTm enter the RXING state first and then enter the TXCOL. It is possible, however, that ACTEm and ACTTm do not enter the RXING state and enter the TXCOL state when two or more incoming packets from different repeater units arrive simultaneously.

FIG. 13 is a timing diagram 1300 illustrating the operation of the present invention when two repeater units experience a receive collision state at the same time. Repeater units N and M begin in the READY state. Repeater unit N detects a receive collision 1302. The first level integrator asserts LH1RACTE, LH1RACTT, RACTE, and RACTT 1304, 1306 indicating a receive collision state (RXCOL). During this receive collision state, repeater unit M also detects a receive collision and asserts ACTEm and ACTTm 1308. Because two receive collision states are detected, the first level integrator transitions from a RXCOL to a TXCOL signal 1310, 1312 (e.g., LH1RACTE and RACTE are deasserted). When one of the repeater units ceases detecting a receive collision 1314, only a single receive collision state exists and the first level integrator returns to the RXCOL signal 1316, 1318 (e.g., LH1RACTE and RACTE are asserted). When the final receive collision state ceases 1320, the first level integrator returns to the READY state 1322, 1324.

FIG. 14 is a timing diagram 1400 illustrating the operation of the present invention when the transmit collision exists between repeater units connected to different first level integrators 304 and first level busses 306. Repeater units N and M begin in the READY state. Repeater unit N receives a transmission from a DTE 102 connected to it and enters the RXING state 1402. After a brief propagation delay, the first level integrator transitions from the READY state to the RXING state 1404, 1406. A DTE connected to repeater unit N transmits clock and data to repeater unit N, which transmits the data and clock to the first level bus, where it is accessed by repeater unit M. During this transmission, a repeater unit connected to a different first level integrator and first level bus attempts to transmit data and clock information to the network. Because this repeater unit is not connected to the same first level integrator and first level bus as repeater units N and M, these repeater units do not detect the collision and thus the first level integrator does not change the LH1RACTE and LH1RACTT signals. The first level integrator 304 is informed by the second level integrator 404 of the transmission attempted by the repeater unit connected to the other integrator 1410 (e.g., H1RACTT is asserted, indicating a transmit collision). This collision state is input to the first level bus 1412 (e.g., RACTE is deasserted and RACTT remains asserted, indicating a transmission collision). At some point during the transmission collision state, repeater unit N ceases transmitting 1414, and the first level integrator reports this state to the second level integrator 1416 (e.g., LH1RACTE is deasserted), returning to the READY state. Then, the repeater unit connected to the other first level integrator transitions from a TXCOL state to a RXING state. Thus, the first level integrator and first level bus enter the RXING state 1418, 1420. This is because the repeater unit connected to the other first level integrator has not ceased transmitting. However, when the repeater unit connected to the other first level integrator ceases transmitting, the second level integrator transitions from a RXING state to a READY state 1422 (e.g., H1RACTE is deasserted). As a result, the network status information on the first level bus also returns to the READY state 1424 (e.g., RACTE is deasserted).

FIG. 15 is a timing diagram 1500 illustrating the operation of the present invention when a receive collision occurs within a single repeater unit N. Repeater units N and M begin in the READY state. A DTE 102 connected to repeater unit N begins to transmit and repeater unit N enters the RXING state 1502. (ACTEn is asserted.) The first level integrator transitions from the READY state to the RXING state 1404, 1406. Data and clock are transmitted from the DTE to repeater unit N. Repeater unit N transmits the data and clock to the first level bus 306 from where the data and clock may be accessed by other repeater units, such as repeater unit M. During the transmission of this data, repeater unit N receives data from the first level bus 306 and ACTTn is asserted and repeater unit N enters the RXCOL state 1508. The first level integrator indicates that the network is in an RXCOL state 1510, 1512. When repeater unit N leaves the RXCOL state 1514, the first level integrator transitions from the RXCOL state to the READY state 1516, 1518.

V. Conclusion

An expandable repeater is disclosed which comprises of a number of repeater units connected to an integrator. A repeater unit may be a single monolithic integrated circuit.

Each repeater unit may be connected to an integrator and a bus to provide network status information, and data and clock information to other repeater units and the integrator. The integrator may provide network status information, and data and clock information to the repeater units. The integrator coordinates the repeater units in a manner which allows them to operate as a single repeater under the IEEE 802.3 Standard, thus allowing a greater number of DTE to be connected to a single repeater. Integrators may be cascaded in an hierarchical manner to provide an infinitely expandable repeater. Moreover, the expandable repeater does not require request and acknowledge signals to transmit to the integrator.

The above described embodiments of the invention are intended to be illustrative only. Numerous alternative embodiments may be devised by those skilled in the art without departing from the spirit and scope of the following claims.

I claim:

1. An expandable repeater, comprising:
    a. a plurality of repeater units, each repeater unit:
        (1) being connectable to at least one data terminal;
        (2) having a repeater unit input/output (I/O), the repeater unit I/O configured to transmit and receive data, timing, and repeater unit status information and configured selectively to receive the repeater unit data, clock, transmit type, and transmit enable signals and selectively transmits to the repeater unit data, clock, received enable status, and receive type status signals;
    b. a bus configured to receive data, timing, and repeater set status information; and
    c. an integrator connected to receive status information from repeater unit I/Os; to generate repeater set status signals; and to transmit the repeater set status signals to the bus;
wherein the integrator coordinates the operation of the plurality of repeater units.

2. An expandable repeater, comprising:
    a. a plurality of repeater units, each repeater unit:
        (1) being connectable to at least one data terminal; and
        (2) having a repeater unit input/output (I/O), the repeater unit I/O configured to transmit and receive data, timing, and repeater unit status information;
    b. a bus configured to receive data, timing, and repeater set status information; and
    c. an integrator connected to receive status information from repeater unit I/Os, to generate repeater set status signals, and to transmit the repeater set status signals to the bus;
wherein the integrator is a first level integrator and the bus is a first level bus, wherein the expandable repeater further comprises:
    a. a plurality of first level integrators, each first level integrator:
        (1) being connectable to at least one repeater unit;
        (2) having a first level repeater set input/output (I/O), the first level repeater set I/O configured to transmit and receive data, timing, and first level repeater status information;
    b. a second level bus configured to receive data, timing, and second level repeater set status information; and
    c. a second level integrator connected to receive status information from the first level repeater set I/Os; to generate second level repeater set status signals; and to transmit the second level repeater set status signals to the second level bus;
wherein the second level integrator coordinates the operation of the plurality of first level integrators.

* * * * *